Oct. 25, 1966 V. T. TOMBERG 3,280,636
BIO-MONITORING SYSTEM
Filed June 2, 1964 2 Sheets-Sheet 1

INVENTOR.
Victor T. Tomberg
BY
Michael Ebel
ATTORNEY

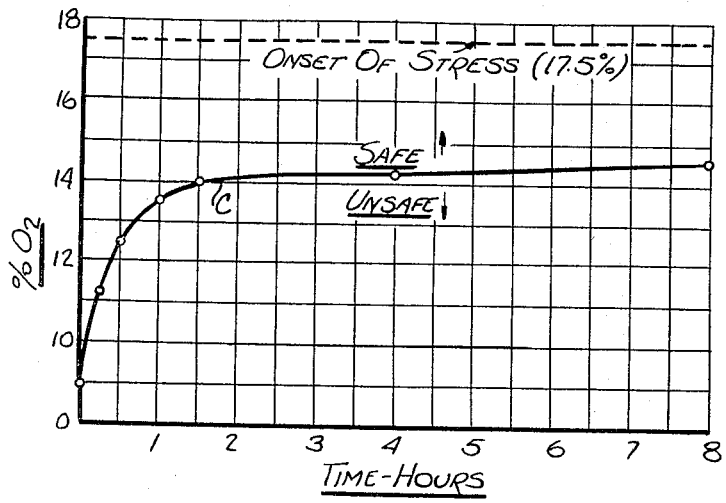
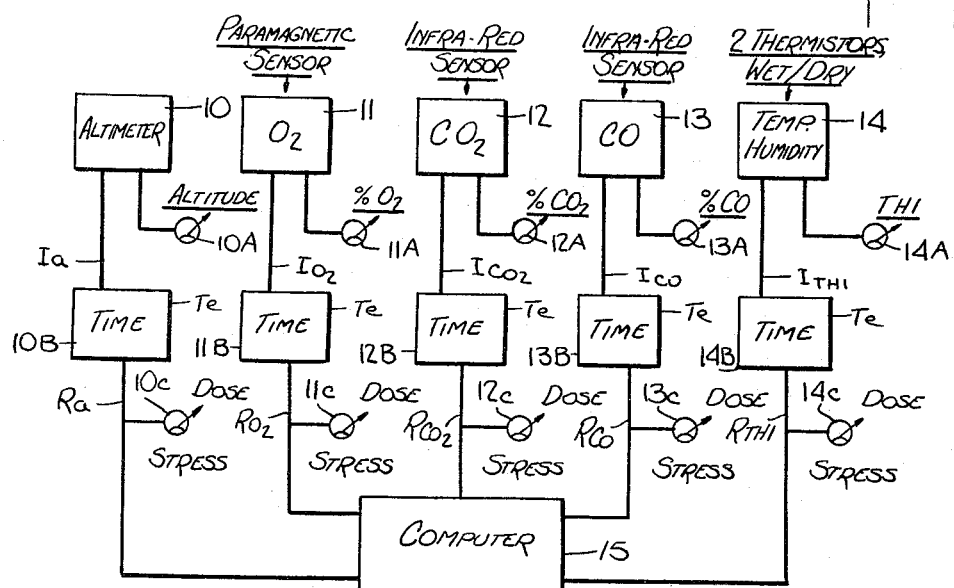
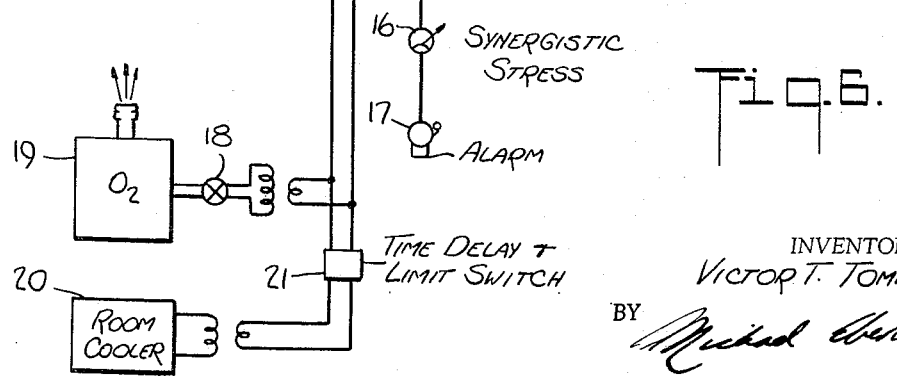

United States Patent Office 3,280,636
Patented Oct. 25, 1966

3,280,636
BIO-MONITORING SYSTEM
Victor T. Tomberg, 84—25 Elmhurst Ave.,
Elmhurst, N.Y.
Filed June 2, 1964, Ser. No. 371,996
10 Claims. (Cl. 73—432)

My invention relates generally to bio-monitoring systems for evaluating biological data, and more particularly to a computer arrangement adapted to integrate biological stress factors to produce tolerance readings and to control the introduction of corrective measures when the tolerance reading exceeds a predetermined safety level.

There are many situations in which several signals, each representative of a particular intelligence or parameter must be concurrently monitored or recorded. Thus in physiological and bio-medical investigations, where a patient or experimental animal is subjected to physical tests under actual stress conditions, it is often necessary to monitor such variables as body temperature, heart and respiration rate, blood pressure, and hydration. Similarly, in space capsules or in simulated space chambers for training purposes, it is necessary to monitor the environmental conditions to which the crew members are subjected on the ground or in flight.

When an individual is confined within a space chamber or capsule, there are various environmental parameters which affect his well-being. Thus, adverse conditions may be created by an insufficient supply of oxygen, the excessive presence of carbon dioxide exhaled by the individual, the accumulation of such toxic gases as carbon monoxide, as well as radiation effects. Moreover, the individual's performance is influenced by temperature and humidity changes, altitude syndromes, and other factors having significant psychological and physiological effects.

I have found that hazardous condition may develop not only when a particular parameter, such as lack of oxygen, attains a threshold value, but also when a combination of interacting stress factors, any one of which is at a level considered tolerable, together produces an intolerable condition endangering the safety of the individual. Thus in a given situation, a multiplicity of environmental parameters come into play and if separately monitored, each parameter may appear to lie within an acceptable range. Nevertheless, the synergistic interplay of the various parameters may be such as to constitute a genuine danger to the confined individual and to his assigned mission.

With existing arrangements, where only individual environmental parameters are monitored and the reaction of the individual thereto is detected, though a medical specialist may sense the existence of an adverse reaction or an excessive physiological compensation, he can only introduce corrective measures when such symptoms come into being and not well in anticipation thereof.

Accordingly, it is the main object of this invention to provide a bio-monitoring system responsive to a plurality of different biological stress factors each of which is converted into a vector or analog value, the various values being integrated to provide a reading representative of the synergistic interaction of the several stresses, whereby a condition of danger may be indicated and an alarm given well in advance of an adverse reaction on the part of the individual subjected to the stresses.

The reason an advance warning is important, is that normally there is a lag between the physiological, psychological or biological reactions, and the synergistic factors leading to such adverse reactions. Hence once the reaction takes place, it may be difficult or impossible to reverse, for even after a corrective dose is introduced, there is again a lag in the individual's reaction before he responds favorably to the correction. Hence if the possibility of an adverse reaction is anticipated before it actually occurs, it can effectively be prevented.

It is also an object of the invention to provide a bio-monitoring system of the above type, in which the computer which integrates the stress factors also serves to control the introduction of corrective measures as soon as the stress level exceeds a pre-set value and well before an adverse reaction sets in.

For a better understanding of the invention as well as other objects and further features thereof, reference is made to the following detailed description to be read in conjunction with the accompanying drawings, wherein:

FIG. 4 is a graph showing the stress effects of oxygen and time;

FIG. 6 is a schematic block diagram of a bio-monitoring system in accordance with the invention.

Figure 1:
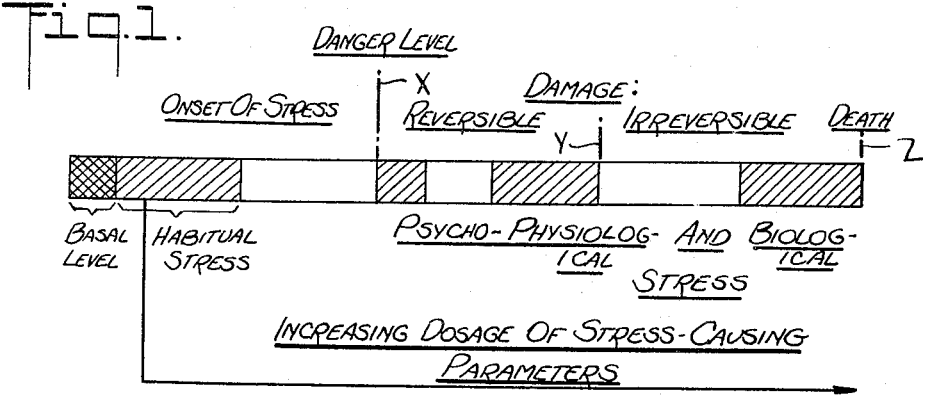
FIG. 1 is a graph illustrating the concept of stress, in accordance with the invention.

Referring now to the drawings, and more particularly to FIG. 1, there is shown graphically the effect of increasing dosage of stress-causing parameters on an individual. As pointed out previously, stress is produced in an individual by various environmental parameters, such as oxygen content of the chamber atmosphere, altitude, temperature, humidity, and so on. Each human being inevitably lives under "habitual stress" to which he makes a physiological and psychological accommodation. But when this habitual stress level is exceeded, then we enter a range approaching the danger threshold, indicated by vertical line X.

As to any one environmental parameter, the point at which the threshold is reached does not depend solely on the intensity of the parameter, but it is also a function of time. Thus one can tolerate a certain lack of oxygen for, say, an hour or so, but thereafter the same degree of oxygen insufficiency becomes unsafe. Thus the time of exposure to a given parameter must be taken into account in arriving at the stress factor.

When the danger threshold is exceeded, we enter the region of damage, initially psychological and then physiological, wherein a sickness syndrome is produced of a reversible nature up to the stress level indicated by vertical line Y. When level Y is exceeded, as for example when the percentage of oxygen supply is very low for a prolonged period, then the damage assumes an irreversible nature and biological damage is encountered leading to death at level Z.

Figure 2:
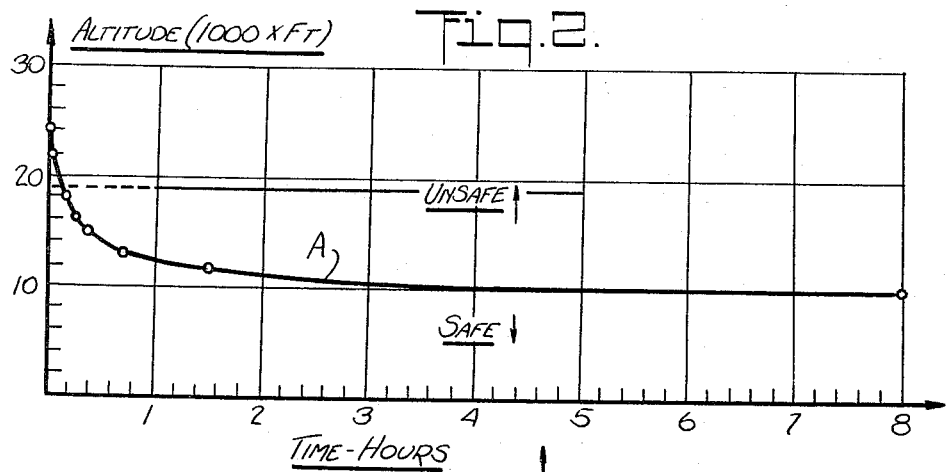
FIG. 2 is a graph showing the stress effects of altitude and time.

Thus referring to FIG. 2, the stress effects for non-acclimatized individuals of altitude and time are graphically illustrated by curve A, which is plotted with altitude in terms of feet, along the ordinate, and time in terms of hours, along the abscissa. This parameter produces an unsafe condition in the area above curve A, and a safe condition therebelow. It will be seen from curve A that for a brief initial period (less than 2 minutes) an altitude of 24,000 feet is tolerable, whereas two hours later the tolerance has dropped to about 12,000 feet, and four hours later it is down to about 10,000 feet. Hence the stress factor is a function both of altitude and time.

Figure 3:
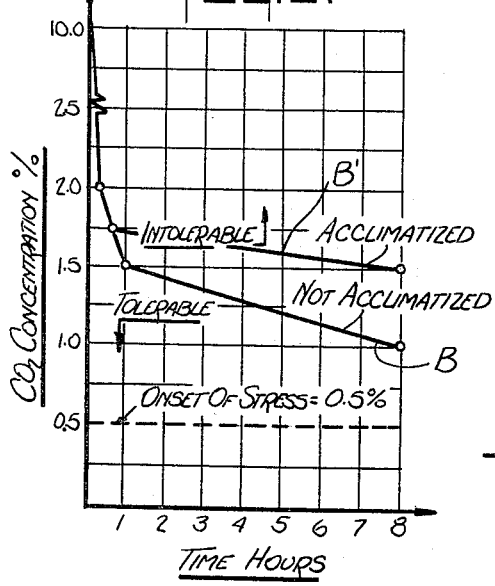
FIG. 3 is a graph showing the stress effect of carbon-dioxide and time.

Referring now to FIG. 3, curve B illustrates the stress effects of carbon dioxide, the percentage of the gas being plotted against time. It will be seen that at the outset a concentration percentage as high as 10% $CO_2$ can be tolerated, whereas eight hours later anything above 1% is intolerable. Curve B deals with an acclimatized individual, as against an unacclimatized individual represented by curve B', and at curve B' it will be noted that after eight hours a maximum of $CO_2$ percentage of 1.5% can be tolerated by an acclimatized person.

In FIG. 4, the stress curve C is with respect to oxygen content in terms of percentage as plotted against time. It will be noted that the safe value begins with a 5% concentration of oxygen, but after an hour and a half, anything less than 14% is unsafe.

Figure 5:
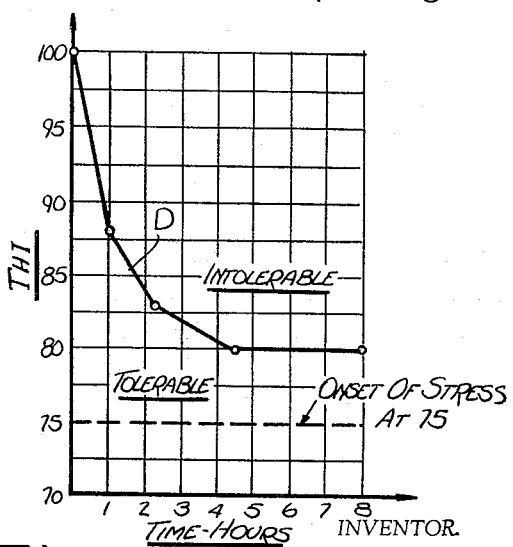
FIG. 5 is a graph showing the stress effects of THI and time.

In FIG. 5, the parameter represented by curve D is THI, which is an experimental comfort factor equal to 0.4 (temperature:dry+temperature:wet)+15. Starting with a THI of 100, after five hours, anything above 80 becomes intolerable. While FIGS. 2, 3, 4 and 5 deal with four distinct environmental conditions, it can be demonstrated that for other conditions, such as vibration, noise, pollution, radiation, etc., the resultant stress factor is a function of the intensity or magnitude of the parameter in question and also a function of the time of exposure parameter.

As indicated above, any one stress factor may reach a sufficient dosage to cause damage. But while the various factors may separately lie below the danger line, their interaction may nevertheless be such as to create a synergistic stress value giving rise to damage. In accordance with the invention, the various stress factors operative in a given situation are added algebraically or as vectors to provide an integrated or synergistic stress value indicative of whether the individual is subjected to a tolerable or intolerable condition.

The symbol R will hereinafter be assigned to each stress factor, R being equal to the product of the intensity or magnitude I of the environmental parameter in question, and the time of exposure parameter. R, therefore, is equal to $I \times T^e$, where $e$ is an appropriate exponent. The stress factor for the oxygen percentage is indicated by $R_{O_2}$, for carbon dioxide by $R_{CO_2}$, etc. The sum of the stress factors R is represented by symbol $\mathcal{S}$, which stands for the synergistic or integrated stress factor. When the sum of the stress factors is less than 1, that is, when $R_{O_2} + R_{CO_2} + R_{CO} + R_n \leq 1$, the integrated stress is tolerable, but above 1, the danger region is entered.

In order to integrate the stress factors R it is necessary to provide a system, as illustrated in FIG. 6, composed of a plurality of sensors, each of which is responsive to a specific parameter, such as altitude, to generate an analog voltage proportional to the intensity I thereof. The analog voltage is multiplied with a potential $T^e$ derived from a time-controlled generator, the potential depending on the time of exposure parameter, whereby the resultant voltage represents the stress factor R.

The various stress factors R are applied to a computer which integrates these values to produce the synergistic stress factor $\mathcal{S}$. When $\mathcal{S}$ rises above 1, an alarm is sounded. The output of the computer may also be used to control an oxygen supply, a dehumidifier, an air conditioner system, or any other device adapted automatically to correct the condition within the environmental chamber in a direction and to an extent reducing $\mathcal{S}$ to a value below 1.

Thus in FIG. 6, the sensors in the chamber or capsule are represented by an altimeter 10, a paramagnetic sensor 11 to detect the concentration of oxygen, an infra-red detector 12 responsive to the concentration of $CO_2$, an infra-red detector 13 whose sensitivity is to the concentration of CO, and a thermistor 14 to detect wet and dry temperatures and arranged to produce a THI reading.

The nature of these sensors forms no part of the present invention, and any standard form of sensor or transducer adapted to convert an environmental parameter to an analog voltage, may be used. Moreover, the invention is not limited to the particular set of sensors shown, and in practice, the installation may include radiation detectors to determine the level of beta or gamma radiation, pollution detectors to determine the dust concentration in the atmosphere, barometric detectors to sense the pressure within the capsule, and various other forms of transducers, depending on the factors which in a given situation are most relevant to the well-being of the confined individual.

Each sensor is coupled to an appropriate indicator to provide a direct reading of the environmental parameter being measured. Thus, the output I of the altimeter 10 is fed to a meter 10A calibrated in terms of altitude above sea level. The output of the $O_2$ sensor 11 is applied to meter 11A, that from the $CO_2$ sensor 12 is fed to meter 12A, that from CO sensor 13 to meter 13A, and the output from the THI detector 14, to meter 14A.

In its simplest form, the time of exposure parameter $T^e$ may be a clock motor which drives a potentiometer to produce a direct voltage depending on the clock position. Thus the time block 10B, 11B, 12B, 13B and 14B, in each channel, represents the output $T^e$ of the potentiometer which is combined with the environmental parameter I to produce the stress factor R. Each stress factor is indicated by a separate meter 10C, 11C, 12C, 13C and 14C. Thus the existing dosage for any one stress factor can be immediately seen.

The outputs $R_a$, $R_{O_2}$, $R_{CO_2}$, $R_{CO}$ and $R_{THI}$, are applied to an analog computer 15 which integrates these stress factors to produce the synergistic stress value $\mathcal{S}$. In practice, it is also possible to use digital computer techniques by first converting the analog stress value into coded digital pulses. The output of the computer 15 is applied to a tolerance meter 16 which is calibrated to indicate whether $\mathcal{S}$ is above or below 1. Coupled to the output of meter 16 is a visual or audio alarm device 17 which is arranged to respond only if $\mathcal{S}$ is 1 or higher, thus sounding an alarm when $\mathcal{S}$ is above tolerance level. Since the values involved throughout the system are all translated into analog voltages, the meters in every case are conventional voltmeters suitably calibrated. Thus the individual stress factors are displayed and the total interaction of these factors is also displayed.

When the synergistic stress factor is 1 or higher, the output of the computer 15 may be used to operate a valve 18 to increase the supply 19 of oxygen fed into the chamber above its pre-set value, or to reduce the temperature of the room through a suitable cooler 20. To prevent hunting of this closed loop system, a time-delay device 21 may be interposed. These expedients are merely illustrative, for various other auxiliary forms of corrective devices may be introduced as stress-decreasing means.

While I have described and shown a preferred embodiment of a bio-monitoring system in accordance with my invention, it will be appreciated that many changes and modifications may be made therein without, however, departing from the essential spirit of the invention as defined in the annexed claims.

What I claim is:

1. A system for indicating the synergistic stress factor developed in the course of time within an environmental situation, said system comprising a plurality of sensors each responsive to a specific environmental parameter to produce a value indicative of the intensity thereof, means to derive from each value an analog voltage representing the product of said value and a time of exposure parameter, each analog voltage reflecting a specific stress factor, and means to integrate said analog voltages to produce a value reflecting the synergistic stress factor.

2. A system as set forth in claim 1, wherein one of said sensors is an altimeter.

3. A system as set forth in claim 1, wherein one of said sensors is an infra-red detector responsive to the concentration of carbon dioxide in the environmental situation.

4. A system as set forth in claim 1, wherein one of said sensors is a thermistor circuit for measuring THI in the environmental situation.

5. A system for indicating the synergistic stress factor developed within an environmental situation in the course of time, said system comprising a plurality of sensors each responsive to a specific environmental parameter to produce a value indicative of the intensity thereof, means to derive from each value an analog voltage representing the product of said value and a time of exposure parameter, each analog voltage reflecting a specific stress factor, means separately to indicate each specific stress factor, means to integrate said analog voltages to produce a value reflecting the synergistic stress factor, and means to indicate said synergistic stress factor.

6. A system for indicating the synergistic stress factor developed within an environmental situation in the course of time, said system comprising a plurality of sensors each responsive to a specific environmental parameter to produce a value indicative of the intensity thereof, means to derive from each value an analog voltage representing the product of said value and a time of exposure parameter, each analog voltage reflecting a specific stress factor, means to integrate said analog voltages to produce a value reflecting the synergistic stress factor, and means responsive to said synergistic stress factor to introduce a corrective parameter into said environmental situation when this factor exceeds a predetermined danger level.

7. A system as set forth in claim 6, wherein said last-named means is a temperature cooling device.

8. A system as set forth in claim 6, wherein said last-named means is an oxygen supply device.

9. A system for indicating the synergistic stress factor developed within an environmental situation in the course of time, said system comprising a plurality of sensors each responsive to a specific environmental parameter to produce a value indicative of the intensity thereof, means including a clock-operated voltage source to derive from each value an analog voltage representing the product of said value and a time of exposure parameter, each analog voltage reflecting a specific stress factor, an analog computer to integrate said analog voltages to produce a value reflecting the synergistic stress factor, and alarm means coupled to said computer and rendered operative when said synergistic stress factor rises above a danger threshold.

10. A system for indicating the synergistic stress factor developed within an environmental situation in the course of time, said system comprising a plurality of sensors each responsive to a specific environmental parameter to produce a first voltage indicative of the intensity thereof, means to produce a second voltage whose magnitude varies as a function of the parameter of time, means to combine said first and second voltages to produce an analog voltage representing the product of the environmental and time parameters, each analog voltage reflecting a specific stress factor, a voltmeter for reading each analog voltage to indicate the specific stress factor, means to integrate said analog voltages to produce a potential reflecting the synergistic factor, and a voltmeter to read said potential.

References Cited by the Examiner

UNITED STATES PATENTS 3,229,684   1/1966   Nagumo et al. _____ 128—2

OTHER REFERENCES

The Military Surgeon, February 1954, volume 114, No. 2, pages 79–83.

DAVID SCHONBERG, *Primary Examiner.*